(12) United States Patent
Michioka et al.

(10) Patent No.: US 6,874,939 B2
(45) Date of Patent: Apr. 5, 2005

(54) CIRCULATION MEMBER, MOTION GUIDE DEVICE PROVIDED WITH CIRCULATION MEMBER AND BALL SCREW PROVIDED WITH CIRCULATION MEMBER

(75) Inventors: Hidekazu Michioka, Tokyo-to (JP); Yasuyuki Abe, Tokyo-to (JP)

(73) Assignee: THK Co., Ltd., Tokyo (JP)

( * ) Notice: Subject to any disclaimer, the term of this patent is extended or adjusted under 35 U.S.C. 154(b) by 92 days.

(21) Appl. No.: 10/600,453

(22) Filed: Jun. 23, 2003

(65) Prior Publication Data
US 2004/0000208 A1 Jan. 1, 2004

(30) Foreign Application Priority Data
Jun. 25, 2002 (JP) .................................. P2002-184540

(51) Int. Cl.[7] .......................... F16C 29/06; F16H 25/22
(52) U.S. Cl. ...................................... 384/45; 74/424.86
(58) Field of Search ............................. 384/43–45, 51; 74/424.88, 424.82, 424.86

(56) References Cited

U.S. PATENT DOCUMENTS

| | | | |
|---|---|---|---|
| 4,749,284 A | 6/1988 | Teramachi | |
| 6,102,572 A | 8/2000 | Hidano | |
| 6,176,149 B1 | 1/2001 | Misu | |
| 2002/0026844 A1 | 3/2002 | Fujita | |

FOREIGN PATENT DOCUMENTS

| | | |
|---|---|---|
| EP | 0 857 883 A1 | 8/1998 |
| EP | 0 967 414 A2 | 12/1999 |
| EP | 1 318 332 A2 | 6/2003 |
| JP | 7-208466 | 8/1995 |
| JP | 2000-18359 | 1/2000 |
| SU | 1441121 A1 | 11/1988 |

OTHER PUBLICATIONS

Search Report dated Oct. 31, 2003.

*Primary Examiner*—Thomas R. Hannon
(74) *Attorney, Agent, or Firm*—Westerman, Hattori, Daniels & Adrian, LLP

(57) ABSTRACT

A ball screw comprises a screw shaft, a nut assembled with the screw shaft, a number of balls disposed in the ball rolling passage formed by a ball rolling groove formed to the screw shaft and a loaded ball rolling groove formed to the nut, a number of spacers disposed between the balls in the ball rolling passage, and a circulation member for circulating the balls and spacers in accordance with a relative motion of the nut with respect to the screw shaft. The circulation member is provided with a scoop-up groove for scooping the balls, when contacting the ball rolling in the ball rolling passage, at both side edge portions of the scoop-up groove and is also provided with a spacer scoop-up portion which contacts and scoops the spacer moving in the ball rolling passage without contacting the balls. Such circulation member will be preferably utilized for a motion guide device such as linear motion guide or spline shaft.

7 Claims, 14 Drawing Sheets

CIRCULATION MEMBER, MOTION GUIDE DEVICE PROVIDED WITH CIRCULATION MEMBER AND BALL SCREW PROVIDED WITH CIRCULATION MEMBER

BACKGROUND OF THE INVENTION

1. Field of the Invention

The present invention relates to a circulation member for circulating a number of balls and spacers disposed in a ball rolling passage formed between a track member and a movable member in conformity with a relative motion of the movable member with respect to the track member, and also relates to motion guide device and ball screw provided with such circulation member.

2. Related Art

The applicant of the subject application provided a circulation member such as shown in FIG. 20 applied to a ball screw, which is disclosed in Japanese Patent Application No. HEI 10-180767.

With reference to FIG. 20, a ball screw is formed with a ball rolling groove, and balls 1 rolling along the ball rolling groove contact both edge portions 3a, 3b of a scoop-up groove 3 formed in a circulation member 2 and are then scooped from the ball rolling groove 3 in an embraced fashion. In the case where scoop-up groove 3 is formed in the circulation member 2, an impact force is substantially not applied to the circulation member 2, and therefore, it becomes possible to rotate a screw shaft at high speed to thereby move the balls 1 also at high speed.

Such circulation member 2 may be functionally sufficient to act only to circulate the balls 1. However, there are many cases where spacers are disposed between the balls 1 for preventing friction or like. Such a spacer has substantially cylindrical shape having a diameter smaller than that of the ball 1 and is provided, at its both end portions in the ball advancing direction, with recesses in conformity with the spherical shape of the ball.

When scooping the ball 1 and the spacer by using the circulation member of the conventional structure mentioned above, for example, because the ball 1 has a spherical surface, the ball 1 is embraced and scooped by both side edge portions 3a, 3a of the scoop-up groove 3. In a case where there exists a small gap between the adjacent balls 1, 1, the spacer put between the balls 1, 1 may be also scooped together with the balls. However, as shown in FIGS. 21 and 22, in a case where the spacer 4 freely moves between the adjacent balls 1, 1, there is a fear that the spacer 4 engages with the side edge portions 3a, 3b of the scoop-up groove 3 because the spacer 4 has nearly flat end portions in the advancing direction, thus being inconvenient.

SUMMARY OF THE INVENTION

An object of the present invention is therefore to substantially eliminate defects or inconveniences encountered in the prior art and to provide a circulation member capable of surely scooping a spacer as well as a ball even in an arrangement that a gap exist between balls, for example, of a ball screw.

Another object of the present invention is to provide a ball screw and a motion guide device provided with an improved circulation member mentioned above.

These and other objects can be achieved according to the present invention by providing, in a general aspect, a circulation member formed with a scoop-up groove for scooping the ball and a spacer scoop-up portion by contacting the spacer without contacting the ball.

That is, in one main aspect, the circulation member for achieving the above objects is a circulation member for circulating a number of balls and a number of spacers, each spacer being disposed between the balls, which are arranged in a ball rolling groove formed between a track member and a movable member, in accordance with a relative motion of the movable member with respect to the track member, wherein the circulation member is provided with a scoop-up groove for scooping the balls by contacting the ball rolling in the ball rolling passage at both side edge portions of the scoop-up groove and is also provided with a spacer scoop-up portion which contacts and scoops the spacer moving in the ball rolling passage without contacting the balls.

According to this aspect, the ball rolling on the ball rolling passage is embraced by both side edge portions of the scoop-up groove formed in the circulation member and is then scooped. In such operation, even if the gap between the balls is widened and the spacer tends to come off from a track of the ball, the spacer can be scooped by the spacer scoop-up portion. Also, since the spacer scoop-up portion does not contact the balls being scooped by the scoop-up groove, the spacer scoop-up portion will not be damaged.

In a preferred embodiment of this aspect, the spacer scoop-up portion is formed with an escape surface which is apart from a track of the ball scooped by the scoop-up groove and contacts the spacer, thus contacting only the spacer without contacting the ball.

In another aspect of the present invention, there is provided a ball screw comprising:

a screw shaft formed, on an outer periphery thereof, with a spiral ball rolling groove;

a nut assembled with the screw shaft and formed, on an inner periphery thereof, with a spiral loaded ball rolling groove so as to oppose to the ball rolling groove formed on the screw shaft to thereby form a ball rolling passage;

a number of balls disposed in the ball rolling passage;

a number of spacers disposed between the balls in the ball rolling passage; and a circulation member for circulating a number of balls and spacers, each spacer being disposed between the balls in accordance with a relative motion of the nut with respect to the screw shaft, wherein the circulation member is provided with a scoop-up groove for scooping the balls by contacting the ball rolling in the ball rolling passage at both side edge portions of the scoop-up groove and is also provided with a spacer scoop-up portion which contacts and scoops the spacer moving in the ball rolling passage without contacting the balls.

In preferred embodiments of this aspect, the spacer scoop-up portion is also formed with an escape surface which is apart from a track of the ball scooped by the scoop-up groove and contacts the spacer.

The circulation member has a linear passage having a circular section for linearly moving the ball scooped by the scoop-up groove, and the spacer scoop-up portion is formed at a bottom portion of the scoop-up groove and is formed with an escape surface which is inclined by a predetermined angle with respect to an inner peripheral surface of the linear passage in a sectional area including a center line of the linear passage.

In a further aspect of the present invention, there is also provided a motion guide device comprising:

a track rail formed with a ball rolling groove;

a slide member mounted to the track member to be relatively movable with respect thereto and is formed with a loaded ball rolling groove so as to oppose to the ball rolling groove of the track member to thereby form a ball rolling passage;

a number of balls disposed in the ball rolling passage;

a number of spacers disposed between the balls in the ball rolling passage; and a circulation member for circulating a number of balls and spacers, each spacer being disposed between the balls in accordance with a relative motion of the slide member with respect to the track member, wherein the circulation member is provided with a scoop-up groove for scooping the balls by contacting the ball rolling in the ball rolling passage at both side edge portions of the scoop-up groove and is also provided with a spacer scoop-up portion which contacts and scoops the spacer moving in the ball rolling passage without contacting the balls.

According to the ball screw and the motion guide device, the circulation member has an improved structure of spacer scoop-up portion, so that the ball and the spacer can be surely scooped without damaging the constitutional elements.

The nature and further characteristic features will be made more clear from the following descriptions made with reference to the accompanying drawings.

DESCRIPTION OF THE PREFERRED EMBODIMENTS

Preferred embodiments of the present invention will be described hereunder in detail in conjunction with the accompanying drawings.

Figure 1:
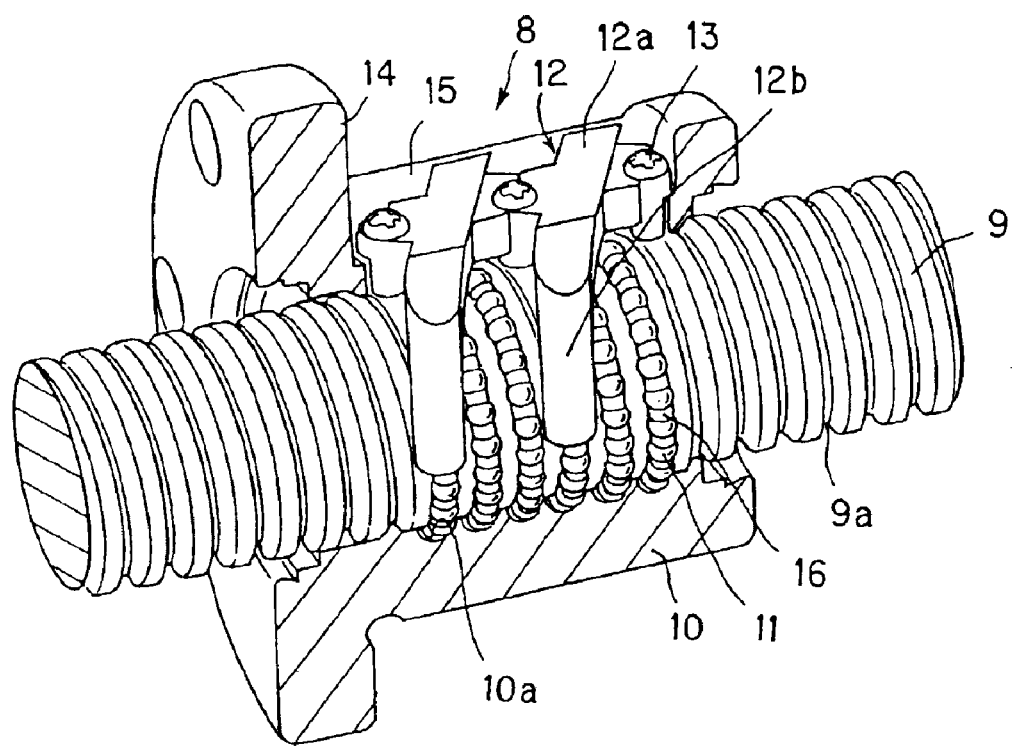
FIG. 1 is a perspective view, partially in section, of a ball screw provided with a circulation member according to a first embodiment of the present invention.

FIG. 1 shows a ball screw provided with a circulation member according to the first embodiment of the present invention.

With reference to FIG. 1, a ball screw 8 is composed of a screw shaft 9 formed with a spiral ball rolling groove 9a formed on an outer peripheral surface thereof and a nut 10 mounted to the screw shaft 9. The spiral ball rolling groove 9a is formed by a grinding or rolling working so as to have a constant lead and approximately semi-circular section.

On the other hand, the nut 10 is formed, on its inner peripheral surface, with a spiral loaded ball rolling groove 10a corresponding to the ball rolling groove 9a of the screw shaft 9. The nut 10 generally has a cylindrical shape and the nut 10 is provided, at its one end, with a flanged potion 14 for mounting the ball screw 8 to a machine or like. The spiral loaded ball rolling groove 10a of the nut 10 is formed so as to have an approximately semi-circular section of the shape corresponding to the ball rolling groove 9a of the screw shaft 9.

The nut 10 is formed with insertion holes, at plural portions, for inserting leg portions 12b, 12b of a circulation member 12.

The ball rolling groove 9a of the screw shaft 9 and the loaded ball rolling groove 10a formed on the nut 10 constitute, in their combination, a ball rolling passage in which a number of balls 11, 11,—are accommodated and spacers 16, 16,—are also accommodated to prevent the balls 11 from contacting each other.

In this first embodiment, the nut 10 is mounted with, for example, two circulation members 12, 12, which are called "return pipes". The circulation member 12 constitutes a non-loaded return passage communicating one end of the ball rolling passage with the other one end thereof so that a number of balls 11, 11,—and spacers 16, 16,—circulate in accordance with the relative motion of the nut 10 with respect to the screw shaft 9.

The circulation member 12 has a gate shape having a central portion 12a and a pair of leg portions 12b, 12b extending from both side end portions of the central portion 12a. These leg portions 12b, 12b are inserted into the ball rolling passage with an interval of several pitches, and the circulation member 12 is fastened to the nut 10 by means of bolts 13 or like.

Figure 2A:
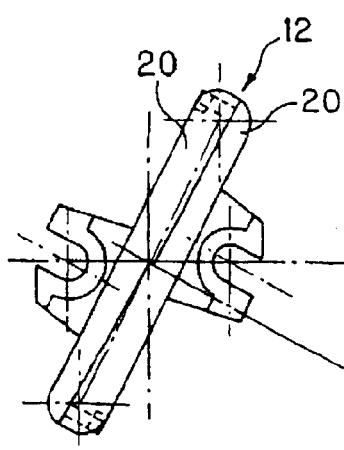
FIG. 2 shows the circulation member and includes FIG. 2A being a plan view of the circulation member, FIG. 2B being a side view thereof as viewed from an axial direction of a screw shaft of the ball screw, FIG. 2C being a side view thereof as viewed from a direction perpendicular to the axis of the screw shaft and FIG. 2D being a front view thereof.
Figure 2B:
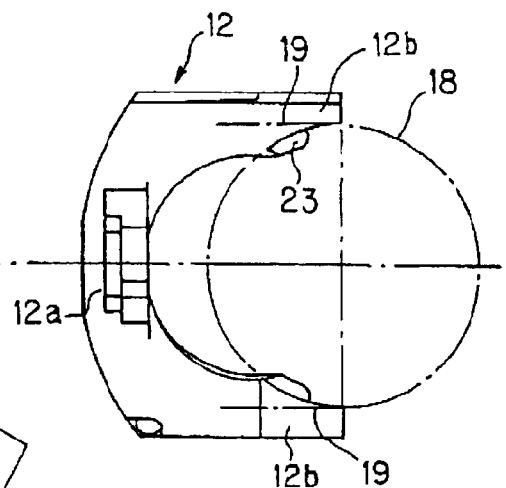
Figure 2C:
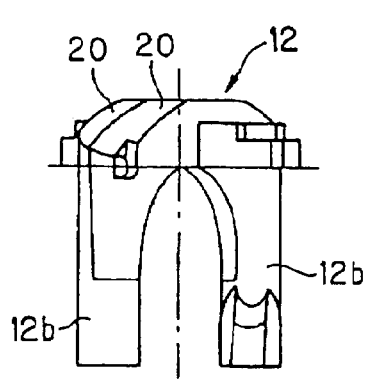
Figure 2D:
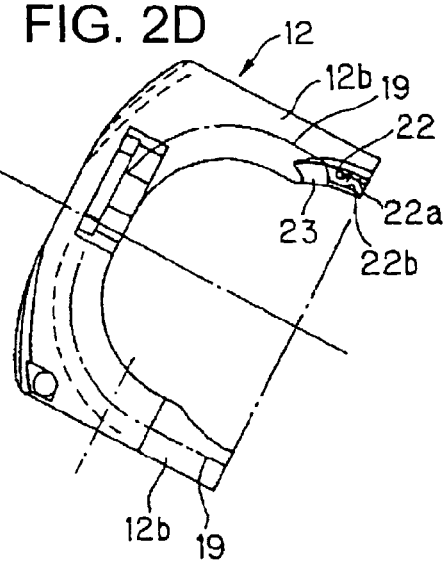

With reference to FIG. 2 (FIGS. 2A to 2D), the circulation member 12 is disposed so that center lines 19, 19 of the inner peripheries of the paired leg portions 12b, 12b are positioned to the tangential direction of the center line 18 of the spiral ball track as shown in FIG. 2B, and the leg portions 12b, 12b are inclined in directions different from each other in conformity with lead angles of the center line 18.

According to such arrangement of the center lines of the leg portions 12b, 12b, the ball 11 can be scooped in the tangential direction and lead angle direction of the track center line 18. That is, the ball 11 can be scooped up along its rolling (advancing) direction. Therefore, no forcible force is not applied to the leg portions 12b, 12b at the time of scooping the ball 11.

The circulation member 12 is divided into two sections or parts along its axial direction as a pair of divided bodies 20, 20, which are then jointed by means of heat calking, fusing, bonding or like process or by using fastening means, adhesive sheet, clip or like.

Next, with reference to FIG. 3, each of the leg portions 12b has a linear passage 21, having a circular section, for substantially linearly moving the ball 11. As mentioned above, the center line 19 of the inner periphery of this linear passage 21 is arranged in the tangential direction of the ball track center line 18 as shown in FIG. 2. The leg portion 12b has a front end extending to the position at which the ball track center line 18 and the center line 19 of the linear passage 21 contact each other, and at a portion near the front end of the leg portion 12 is formed with a scoop-up groove 22 for scooping the ball 11.

Figure 3A:
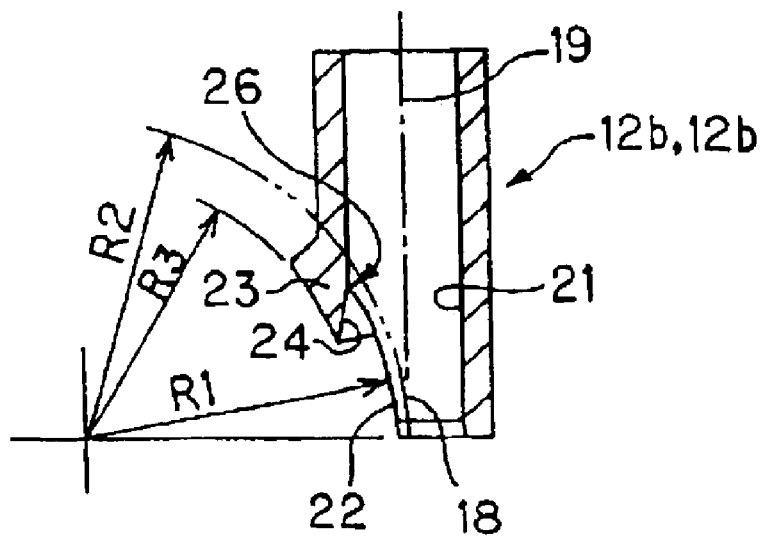
FIG. 3 shows a leg portion of the circulation member and includes FIG. 3A being a sectional view thereof indicating a radius of curvature of a scoop-up groove and FIG. 3B showing a sectional view thereof indicating an inclination (inclining angle) of an escape surface.

Referring to FIG. 3A, the radius R1 of curvature of the scoop-up groove 22 viewed from the axial direction of the screw shaft 9 is designed to be slightly smaller than the radius R2 of curvature of the track center line 18 of the ball 11 and slightly larger than the outer diameter R3 of the screw shaft 9. Further, the scoop-up groove 22 has a lateral width gradually reduced towards the deep direction of the circulation member 12.

A spacer scoop-up portion 23 is formed at the bottom portion of the scoop-up groove 22. The spacer scoop-up portion 23 is formed with an escape surface 24 so as to be apart from the track of the ball 22 scooped by the scoop-up groove 22 and to contact the spacer 16.

Figure 3B:
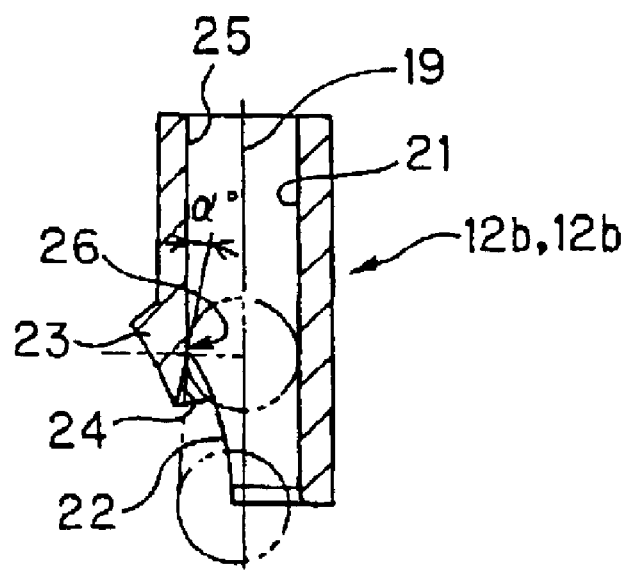

With reference to FIG. 3B, in the sectional area including the center line 19 of the linear passage 21, the escape surface 24 of the spacer scoop-up portion 23 is inclined by a predetermined angle α with respect to the inner peripheral surface 25 of the linear passage 21. According to such design, a boundary portion 26 is formed between the inner peripheral surface 25 of the linear passage 21 and the escape surface 24 of the spacer scoop-up portion 23. This escape surface 24 can contact the spacer 16 without contacting the ball 11 and scoop the spacer 16 moving in the ball rolling passage.

In the structure of this first embodiment, the ball scoop-up groove 22 has a width gradually reduced towards inward the circulation member 12, and the ball 11 can be scooped by the contact of both the side edges of the scoop-up groove 22 to the ball 11. Furthermore, in this embodiment, the spacer scoop-up portion 23 is formed at the bottom of the scoop-up groove 22 so as to guide the spacers 16, 16,—disposed between the balls 11, 11,—into the circulation member 12.

Although it was difficult to manufacture, through machine working, these scoop-up groove 22 and the spacer scoop-up portion 23 because of complicated structures thereof, it becomes possible to manufacture the scoop-up groove 22 and the spacer scoop-up portion 23 having complicated structures by molding the circulation member from resin or metal material. When the circulation member is formed as metal product, it is molded by thermally treating metal powder. On the other hand, a resin product will be molded through an injection molding process. However, it is still difficult to mold the complicated scoop-up groove 22 and spacer scoop-up portion 23 only by using a lateral pair of mold halves. In this embodiment, therefore, the scoop-up groove 22 and spacer scoop-up portion 23 are molded by using a slide mold capable of being slid in the axial direction of the leg portions 12b, 12b.

More specifically, at the molding operation, the slide mold is inserted into a lateral pair of mold halves. Next, under the slide mold inserted state, the scoop-up grooves 22 and the spacer scoop-up portions 23 are formed to the leg portions 12b, 12b. On the other hand, at the mold releasing operation, the slide mold is slid in the opposing direction. As mentioned, by using the slide mold, the scoop-up grooves 22 and the spacer scoop-up portions having complicated structures can be manufactured, as well as the inner peripheral surfaces of the leg portions 12b, 12b.

Figure 4:
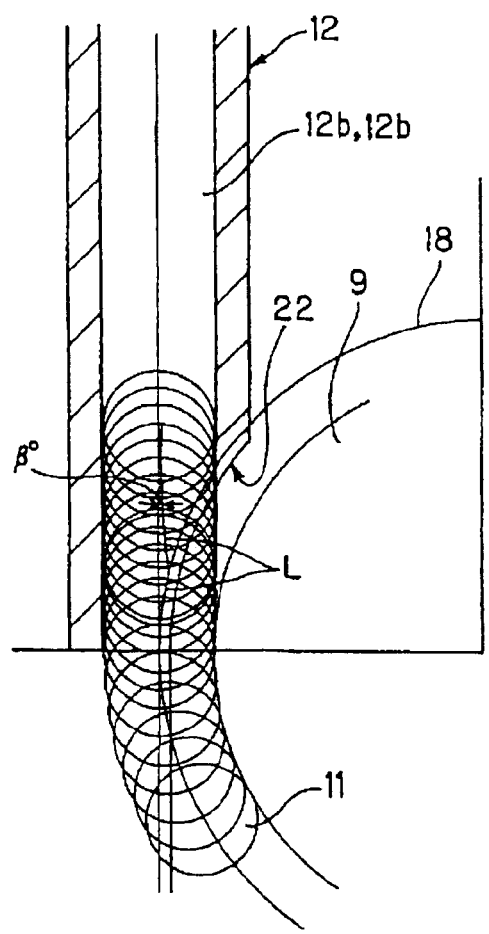
FIG. 4 is an illustration showing a ball scooping state by the scoop-up groove.

The ball scoop-up state by the scoop-up groove 22 is shown in FIG. 4, in which the spacers 16 and the scoop-up portions 23 are removed for the sake of easy understanding of the description for scooping the ball 11 by the scoop-up groove 22.

When the ball 11 rolling along the peripheral direction on the ball rolling groove 9a of the screw shaft 9 rolls in the circulation member 12, both the edge portions 22a, 22b of the scoop-up groove 22 contact the ball 11. At this time, since the width of the scoop-up groove 22 is reduced gradually towards the ball rolling direction (from the lower side towards the upper side as viewed in FIG. 4), the ball 11 can be scooped, as if it is embraced, from the ball rolling groove into the circulation member 12.

The circulation member 12 has an inner diameter, which is slightly larger than an outer diameter of the ball 11 so that the ball 11 can pass the circulation member 12 even in a case where lubricant or like adheres to the ball 11 or the circulation member 12 is slightly displaced. In more strictly, the ball 11 is scooped at after the shifting by an angle β in the screw shaft side and not in the tangential direction of the track center line 18 of the ball 11.

In FIG. 4, the line L denotes the track of the center of the ball 11. As mentioned above, according to this embodiment, the ball 11 can be scooped by both the edge portions of the scoop-up groove 22, a load caused at the time when the ball 11 contacts the scoop-up groove 22 can be significantly reduced.

On the other hand, in a conventional structure of the ball screw having a return pipe type circulation member, it is general that the ball is scooped by a tongue portion formed to the return pipe. In the use of such conventional ball screw, however, when the screw shaft is rotated at a high speed, the ball moves at a high speed (ball movement becomes faster), there is a fear of damaging the tongue portion through the collision of the ball with the tongue portion. In order to obviate such defect, it was necessary to determine the upper limit of the revolution number of the screw shaft, thus having been inconvenient.

Therefore, the present invention has been conceived to overcome such inconvenience and provides a screw shaft capable of being rotated at a high speed by forming the scoop-up groove 22 to the circulation member 12. According to the present invention, as mentioned before, since the ball can be scooped by both the edge portions of the scoop-up groove 22, there is no need for forming the tongue portion as in the conventional structure.

The spacer scoop-up portion 23 acts to scoop up only the spacer 16 and has an outer shape similar to a shape of the tongue portion, which scoops the ball in the return pipe, in the conventional structure. However, the most essential difference of the present invention from the conventional structure resides in the presence of the escape surface 24.

That is, in general, the tongue portion of the conventional return pipe is formed by cutting or grinding, for example, metal tube or grinding stone. Hence, an escape surface (such as escape surface 24 in this embodiment) having a predetermined inclination α with respect to the linear passage is never formed in the return pipe. Since the escape surface 24 is inclined by the predetermined angle of α, a projecting amount from the bottom of the scoop-up groove 22 is made smaller than that of the tongue portion.

Figure 5:
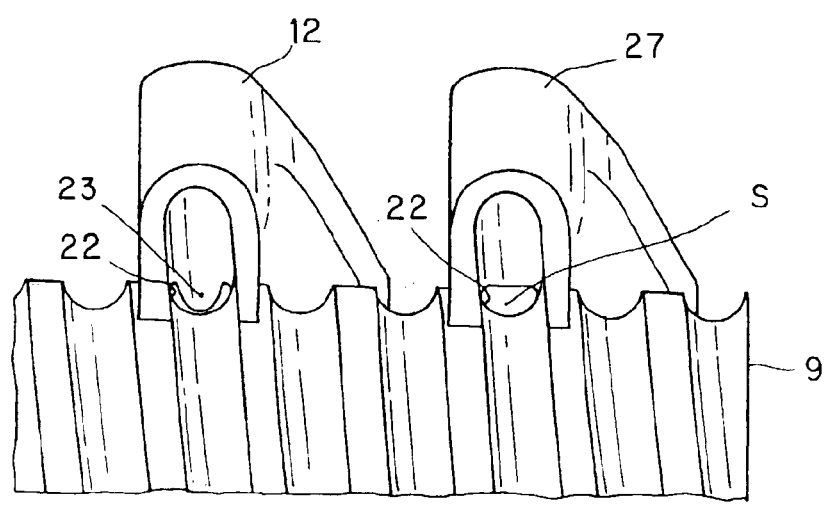
FIG. 5 is an illustration, in an enlarged scale, showing a comparison of gaps between the scoop-up groove and the screw shaft in a case of a circulation member provided with a scoop-up portion and in a case of a circulation member provided with no scoop-up portion.

FIG. 5 shows a comparison of gaps between the scoop-up groove 22 and the screw shaft 9 in the case of the circulation member 12 provided with the scoop-up portion 23 and in the case of a circulation member 27 provided with no scoop-up portion. Further, it is to be noted that, in order to observe the gaps, in this FIG. 5, wall sections of the circulation members 12 and 27 on the side opposing to the scoop-up grooves 22 are eliminated in the illustration.

With reference to FIG. 5, the balls 11 are scooped by the scoop-up grooves 22 positioned on the sides opposing to the illustrated state. In the case of the circulation member 27 provided with no spacer scoop-up portion 23, a relatively large gap S appears between the scoop-up groove 22 and the screw shaft 9, and there is a fear that the spacer 16 dropping off from the ball 11 is adversely engaged with this space S. However, in the embodiment in which the spacer scoop-up portion 23 is formed, such space S can be clogged by the spacer scoop-up portion 23.

Figure 6:
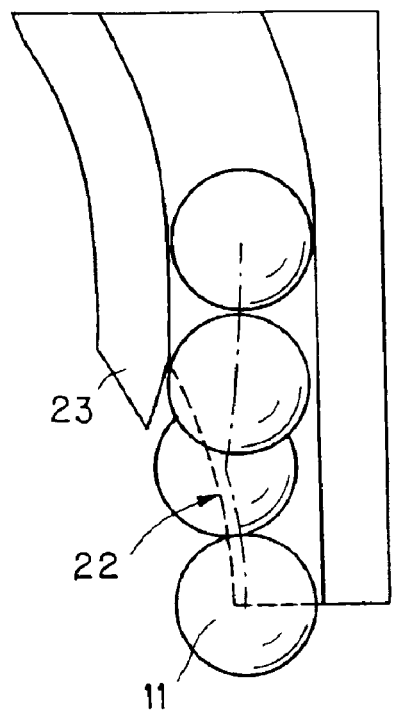
FIG. 6 is an illustration showing a ball scooping state by the scoop-up portion.
Figure 7:
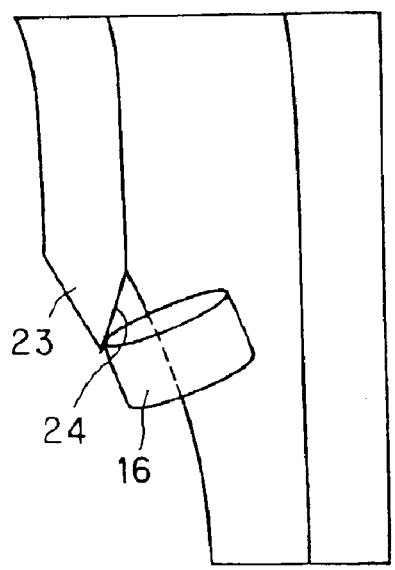
FIG. 7 is an illustration showing a spacer scooping state by a spacer scooping portion.

Next, with reference to FIGS. 6 and 7, the ball 11 is scooped up in the manner of being embraced with both the edge portions of the scoop-up groove 22 (FIG. 6). Furthermore, the spacer 16 can be surely scooped up by the escape surface 24 formed to the spacer scoop-up portion 23 contacting the spacer 16 even if the distance between the adjacent balls 11 is widened and the spacer 16 comes off from the moving passage. The spacer 16 does not always contact the spacer scoop-up portion 23, and only in the case that the distance between the balls 11 is widened and the spacer 16 tends to come off from its track, the spacer 16 contacts the spacer scoop-up portion 23. In the other cases, the spacers 16 are moved together with the balls 11. Further, the spacer scoop-up portion 23 does not contact the ball 11 at the time when the ball 11 is scooped up, thus being not damaged or broken.

Figure 8:
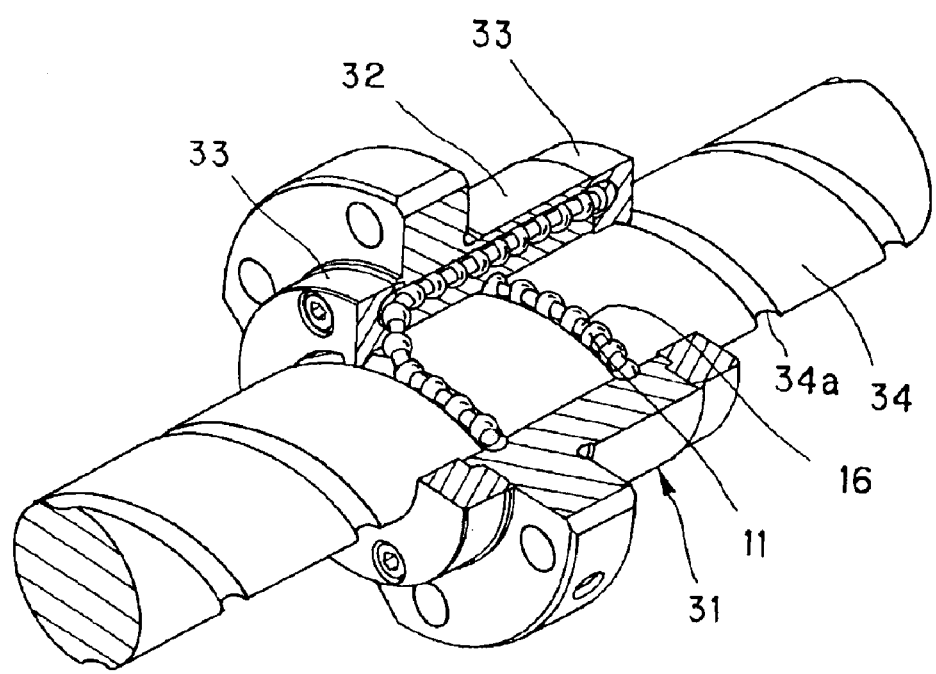
FIG. 8 is a perspective view, partially in section, showing an end-cap type ball screw provided with a circulation member according to a second embodiment of the present invention.

FIG. 8 represents a ball screw of end-cap structure provided with a circulation member according to the second embodiment of the present invention.

The ball screw of this embodiment comprises a screw shaft 34 formed with a ball rolling groove 34a and a nut 31 composed of a nut body 32 formed with a ball rolling groove and side lids as end caps 33, 33 mounted to both ends of the nut body 32. The nut body 32 is formed with the ball rolling groove and a ball return passage, and the side lids 33, 33 are formed with communication passages each communicating the ball rolling groove and the return passage. The circulation member is mounted to each of the side lids 33, 33 so as to act to scoop the balls 11, 11,—and the spacers 16, 16,—disposed between the balls.

Figure 9A:
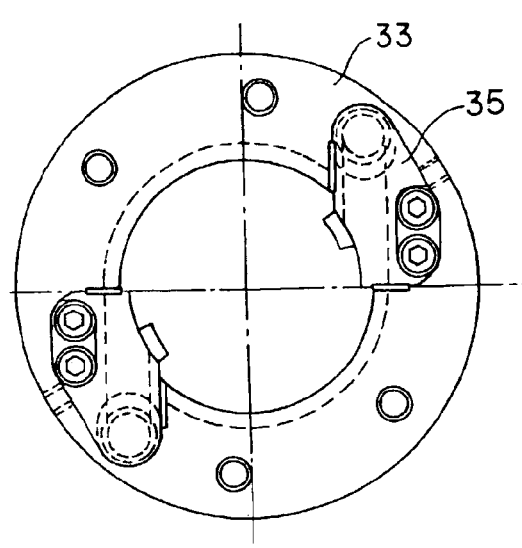
FIG. 9 shows a combination of a side lid and the circulation member of the second embodiment and includes FIG. 9A showing a state viewed from the axial direction of the screw shaft and FIG. 9B showing a state viewed from the side of the screw shaft.
Figure 9B:
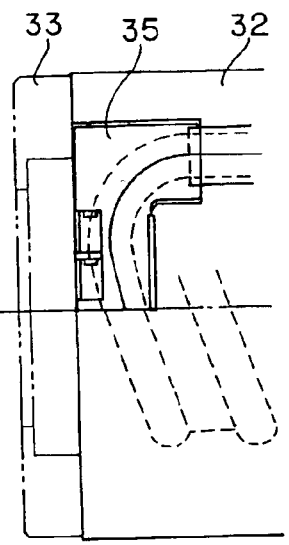

FIG. 9 shows the assembled state of the side lid 33 and the circulation member 35. The circulation member 35 is mounted inside the side lid 33 and fixed to the nut body 32 by means of bolt or like. The circulation member 35 may have a various outer appearances in accordance with a mounting condition to the side lid 33.

Figure 10:
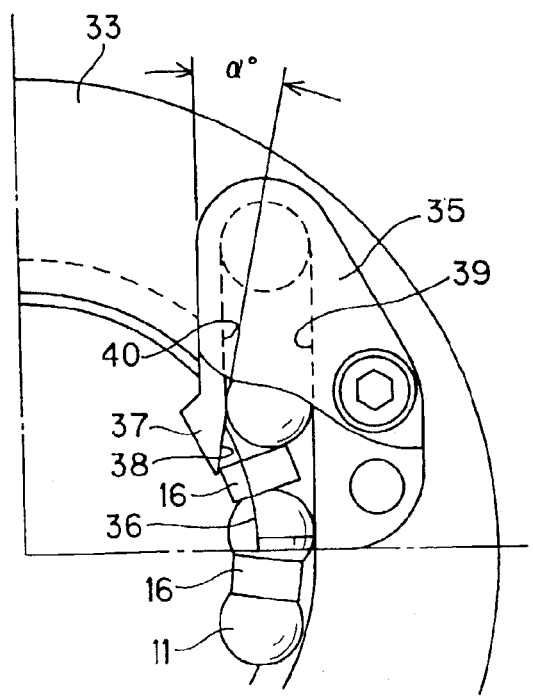
FIG. 10 is an illustration showing the circulation member of the second embodiment.

With reference to FIG. 10 showing the mounting condition of the circulation member 35, the circulation member 35 is provided with a ball scoop-up groove 36 which contacts and then scoops the ball 11 rolling in the ball rolling passage at its both side edge portions. The ball scoop-up groove 36 is formed, at its bottom portion, with a spacer scoop-up portion 37 for contacting and scooping the spacer 16 in the ball rolling groove without contacting the ball 11. The spacer scoop-up portion 37 is formed with an escape surface 38 positioned apart from the ball rolling track and contacting the spacer 16.

The circulation member 35 is formed with a linear passage 39, having a circular section, for moving substantially linearly the ball 11 scooped by the scoop-up groove 36. Further, in the sectional area including the center line of the linear passage 39, the escape surface 38 of the spacer scoop-up portion 37 is inclined by a predetermined angle a with respect to the inner peripheral surface 40 of the linear passage 39. According to this embodiment, the spacer 16 can be scooped up by the escape surface 38 even in the case where the distance between the adjacent balls 11, 11 is widened and the spacer 16 is come off from the moving track.

Figure 11:
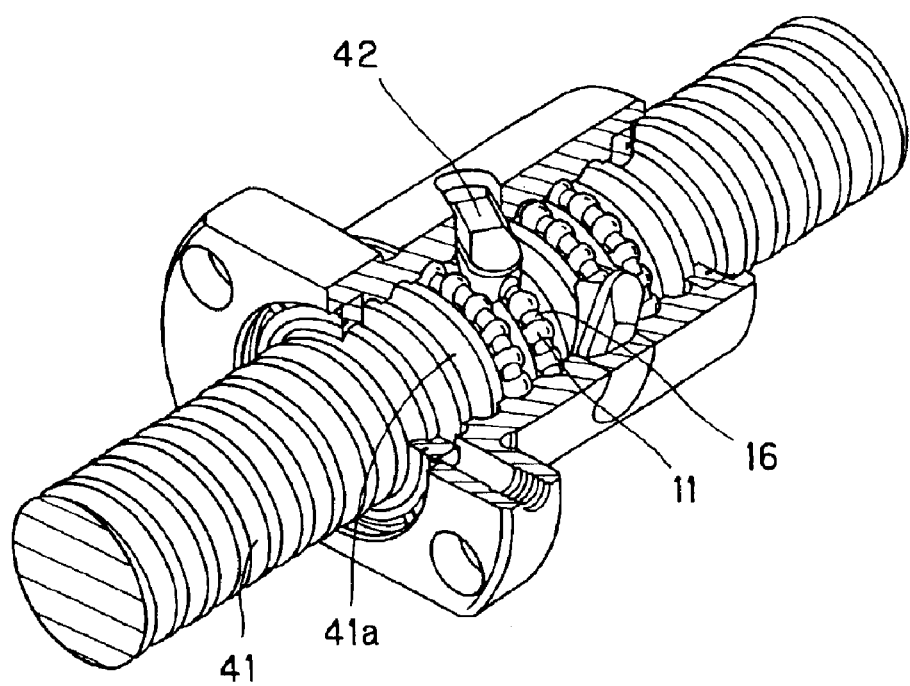
FIG. 11 is a perspective view showing one example of a deflector type ball screw provided with the circulation member of the present invention.

FIG. 11 also represents a ball screw 41 provided with a circulation member of deflector structure type according to another embodiment of the present invention.

With reference to this embodiment of FIG. 11, the balls 11, 11,—and the spacers 16, 16,—traveling on the ball rolling groove 41a of the ball screw 41 once separated therefrom by the circulation member 42 having deflector structure and returned, by one lead, to a portion of the ball rolling groove 41a by jumping over the outer diameter portion of the screw shaft 41. This circulation member 42 is formed with a ball return groove having approximately S-shape. The ball return groove has a most recessed portion at the central portion of the circulation member 42 so that the ball 11 and the spacer 16 advancing in the ball return groove can jump over the outer peripheral portion of the screw shaft 41.

The circulation member 42, i.e., deflector, acts to forcibly push the ball rolling on the ball rolling groove 41a from its lateral side so as to jump the ball over the outer periphery of the screw shaft 41. Further, a spacer scoop-up portion for scooping only the spacer 16 by contacting it without contacting the ball 11 is formed to the circulation member 42. In this deflector type circulation member 42, the escape surface formed to the scoop-up portion has a three-dimensional shape apart from the three-dimensional ball track.

Figure 12:
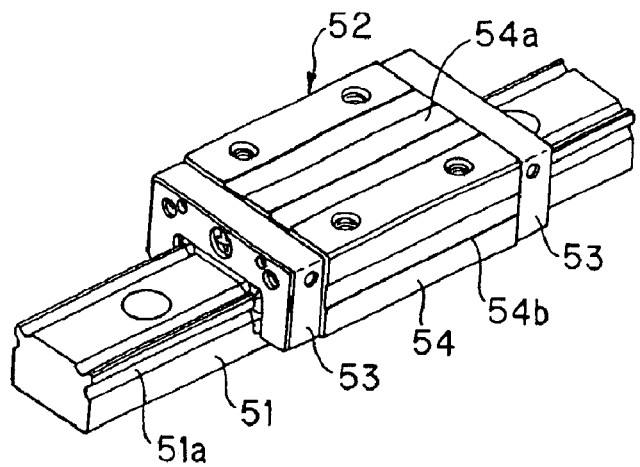
FIG. 12 is a perspective view of a linear motion guide device provided with a circulation member according to a third embedment of the present invention.

The present invention further provides a linear motion guide provided with a circulation member according to the third embodiment with reference to FIG. 12.

The linear motion guide of this embodiment is, for example, a device for guiding a movable member or body such as table on a stationary member such as bed or saddle.

The linear motion guide comprises a track rail 51 disposed on a stationary member and having a longitudinal extension, and a slide member assembled with the track rail 5I to be relatively movable. The track rail 51 is formed with a ball rolling groove 51a formed along the longitudinal direction thereof and the slide member is also formed with a loaded ball rolling groove so as to correspond to the ball rolling groove 51a formed to track rail 51.

The linear motion guide further comprises a number of balls disposed in a ball rolling passage formed by, in combination, the ball rolling groove 51a of the track rail 51 and the loaded ball rolling groove formed to the slide member 52, a number of spacers disposed between the balls, and circulation members 53, 53, provided for the slide member 52, for circulating the balls and the spacers in conformity with the relative motion of the slide member 52 with respect to the track rail 51.

The track rail 51 has an elongated scale so as to provide, for example, a rectangular shape in section. The ball rolling groove 51a constitutes a track for ball rolling, and a plurality of rows of ball rolling grooves 51a may be formed in accordance with the object on use of the linear motion guide. In the illustrated embodiment, the track rail 51 has a linear structure, but it may have a curved rail structure. The track rail 51 has screw holes to which screws are fastened so as to secure the track rail 51 to the stationary member.

The slide member 52 comprises a block body 54 and end plates as the circulation members 53, 53 disposed both end portions of the block body 54. The circulation members 53, 53 are formed with U-shaped direction changing passage for changing the rolling direction of the ball.

The block body 54 of the slide member 52 is a ⊐-shaped member having a flat horizontal portion 54a opposing to the upper surface of the track rail 51, when assembled, and a pair of support leg (skirt) portions 54b,54b opposing to the bilateral side surfaces of the track rail 51. Loaded ball rolling grooves are formed to the inside surfaces of the block body 54 so as to oppose to the ball rolling grooves 51a, 51a formed to the outside surface of the track rail 51. Ball return passages are also formed to the block body 54, as bores, in parallel to the ball rolling grooves 51a. The ball rolling passage and the ball return passage are communicated by means of the direction changing passage formed to the circulation member 53. A plurality of fastening holes are formed to the upper surface of the block body 54 for fastening and securing an object to be guided to the block body 54 by means of screws or bolts.

Figure 13:
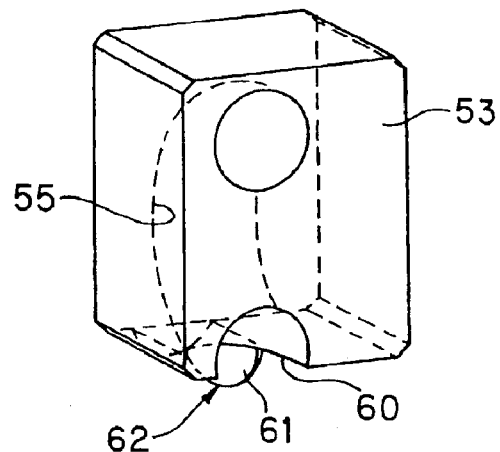
FIG. 13 is a perspective view showing the circulation member.
Figure 14:
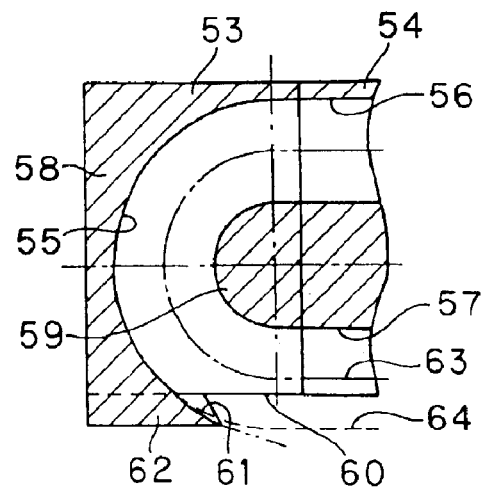
FIG. 14 is a sectional view of the circulation member.

The circulation member 53 will be further described hereunder with reference to FIGS. 13 and 14, in which FIG. 13 is a perspective view of a portion of the circulation member 53 and FIG. 14 is a sectional view showing the direction changing passage 55 formed to the circulation member 53.

The circulation member 53 is formed with, as shown, the ball rolling direction changing passage 55 communicating the ball return passage 56 and the ball rolling passage 57. More specifically, the circulation member is formed with an outer periphery guide portion 58 constituting the outer periphery of the direction changing passage 55 and, on the other hand, the block body 54 is formed with an arch-shaped inner periphery guide portion 59 constituting the inner periphery of the direction changing passage 55.

As shown in FIG. 13, a ball scoop-up groove 60 is formed to the lower portion of the direction changing passage 55 of the circulation member 53 for contacting and then scooping the ball in the ball rolling passage 57 by both side edge portions of the groove 60. The scoop-up groove 60 is formed on one flat surface, in parallel to the track rail 51, on the side of the track rail 51 more than the center line 63 of the direction changing passage 55. The scoop-up groove 60 has a horizontal width gradually reduced towards the ball advancing direction. The ball scooping manner of this scoop-up groove 60 is substantially the same as that of the former embodiment.

As shown in FIGS. 13 and 14, in this embodiment, there is formed, at the bottom portion of the scoop-up groove 60, a spacer scoop-up portion 62 for contacting and then scooping the spacer without contacting the ball in the ball rolling passage 57. The spacer scoop-up portion 62 has an escape surface 61 apart from the track 64 of the ball scooped by the scoop-up groove 60 but contacting the spacer.

Figure 15:
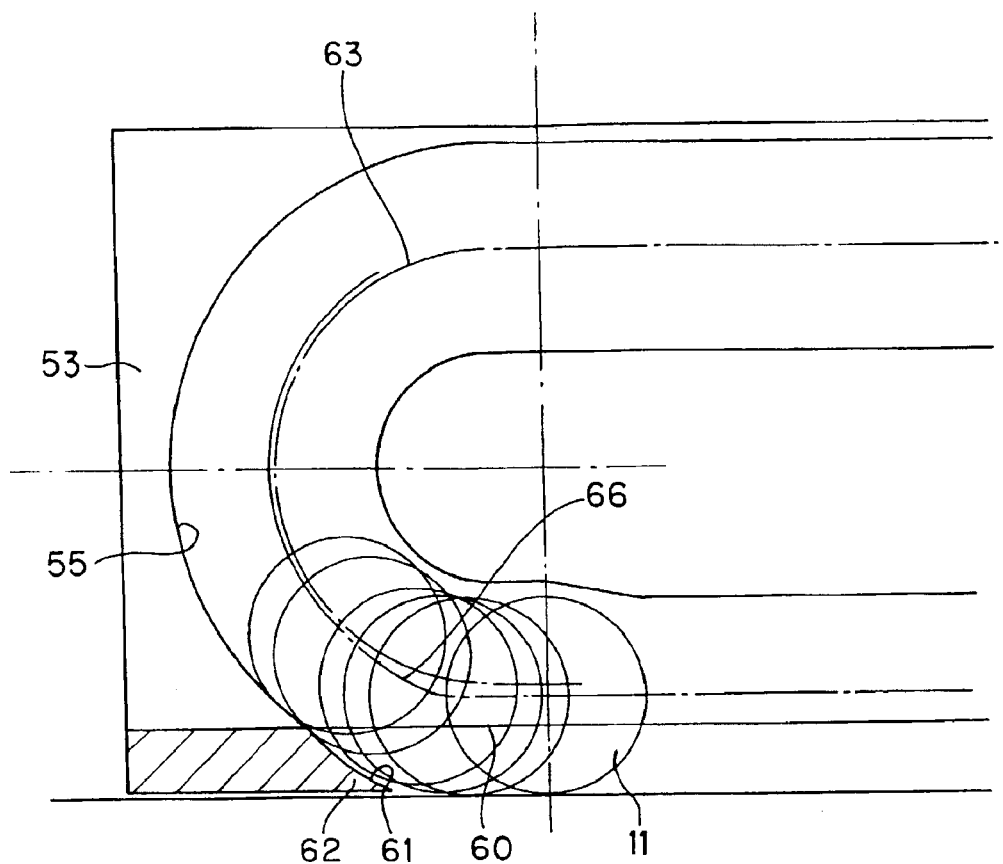
FIG. 15 is an illustration showing a track of the ball scooped by the scoop-up groove.

FIG. 15 shows the track of the ball 11 scooped by the scoop-up groove 60. In this embodiment, different from the embodiment of the ball screw, the direction changing passage 55 of the circulation member 53 is bent in a circular-arc shape. Further, since the small gap exists between the ball 11 and the direction changing passage 55, the track 66 of the center of the ball 11 passes slightly outside the center line 63 of the direction changing passage. Therefore, the escape surface 61 of the spacer scoop-up portion 62 is formed in consideration of this track of the ball 11 so as not to contact the ball. This escape surface 61 may have a curved shape as shown in FIG. 15 as well as linear shape.

Figure 16:
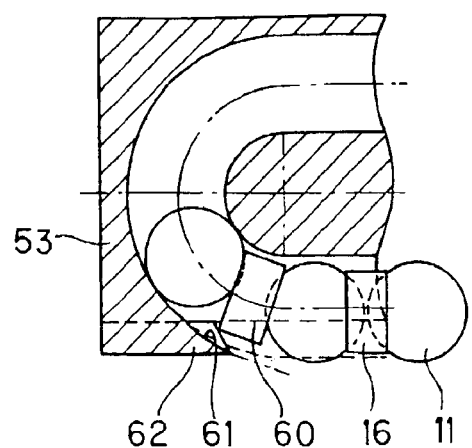
FIG. 16 is an illustration showing a ball scooping state by the scoop-up groove and a spacer scooping state by the spacer scoop-up portion.

FIG. 16 shows the scooping state of the ball 11 by the scoop-up groove and the scooping state of the spacer 16 by the spacer scoop-up portion 62. As shown, the ball 11 is first embraced and then scooped by both the edge portions of the scoop-up groove 60. Even if the distance between the balls 11 and the spacer 16 tends to come off from the track, the spacer scoop-up portion 62 contacting the ball 11 can scoop the ball 11.

Figure 17:
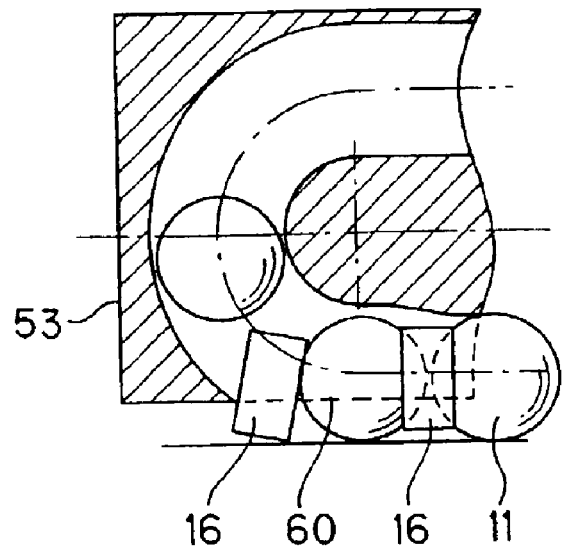
FIG. 17 is an illustration comparative with FIG. 16, provided with no spacer scooping portion.
Figure 18:
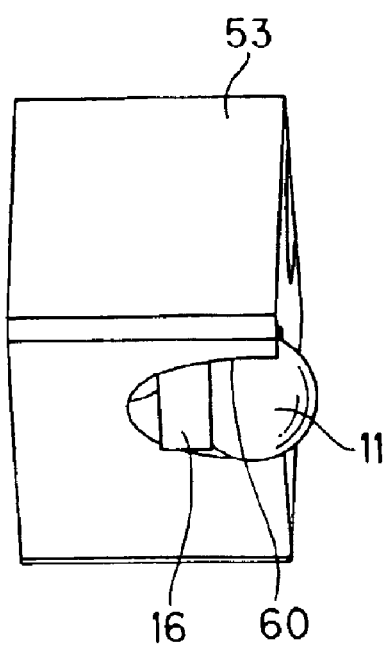
FIG. 18 is a perspective view, comparative with FIG. 16, provided with no spacer scooping portion.

An example provided with no spacer scoop-up portion is shown in FIGS. 17 and 18 for comparison.

In this comparative example, the ball 11 having a spherical outer surface is scooped by both the edge portions of the scoop-up groove 60 in the embraced manner. On the other hand, the spacer 16 has a flat end shape, and in the case when the distance between the balls 11, 11 is widened and the spacer 16 tends to come off from the track, there may cause a fear that the flat end portion of the spacer 16 adversely engages with the scoop-up groove 60, thus being inconvenient.

Figure 19:
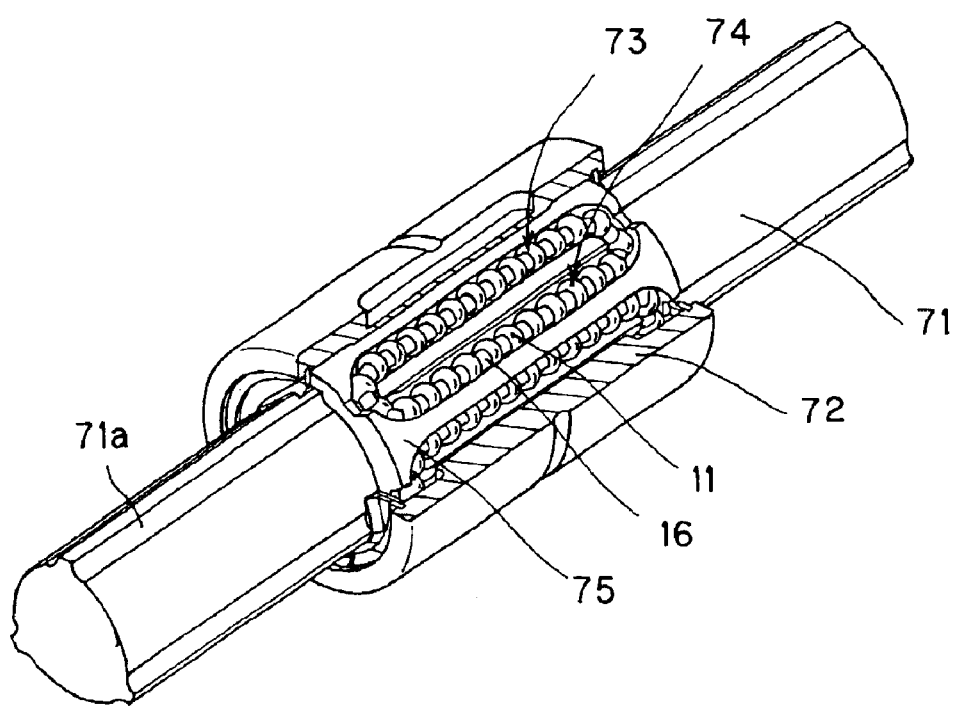
FIG. 19 is a perspective view of a ball spline provided with the circulation member of the present invention.
Figure 20:
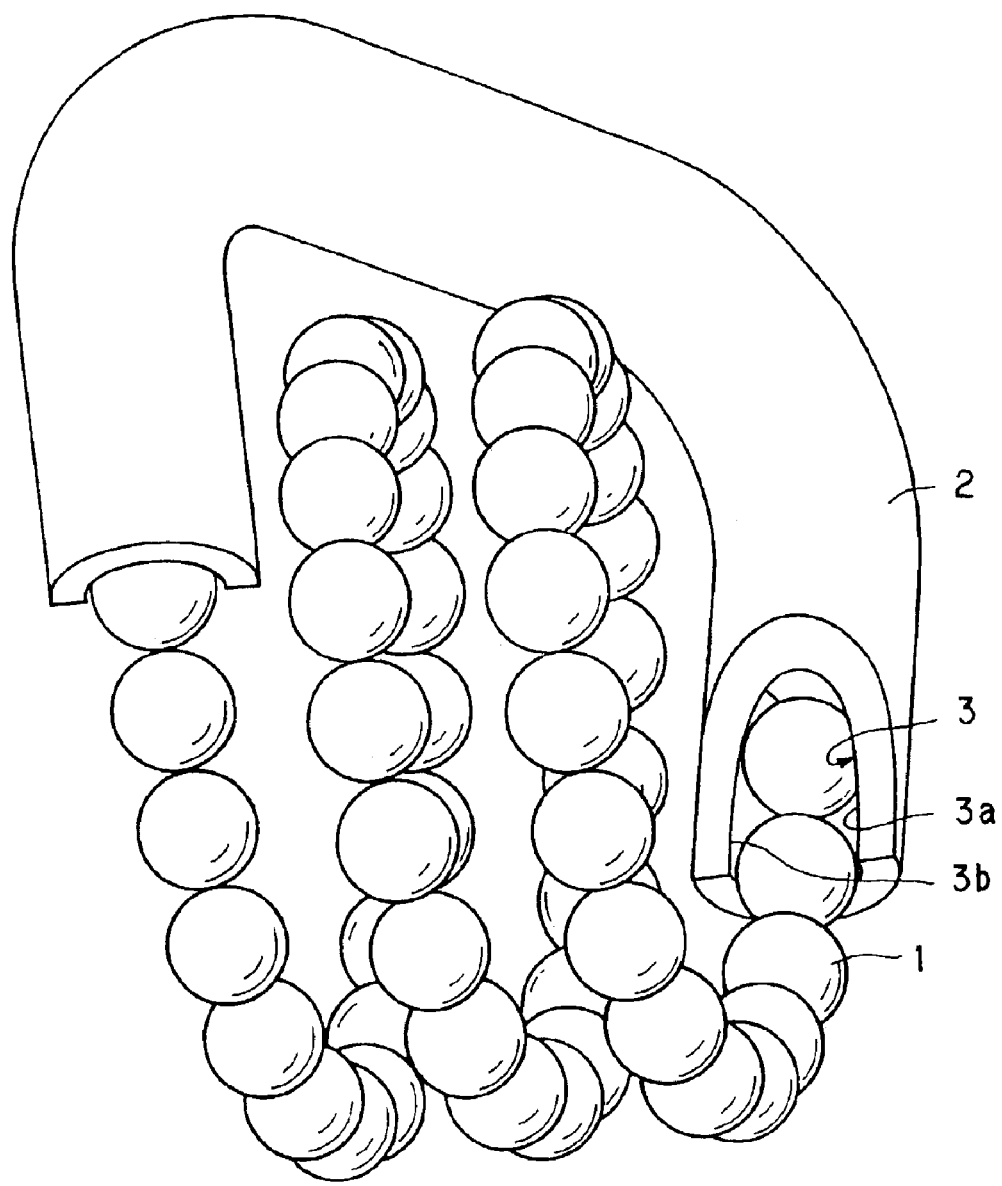
FIG. 20 is a perspective view of a ball screw provided with a circulation member of conventional structure.
Figure 21:
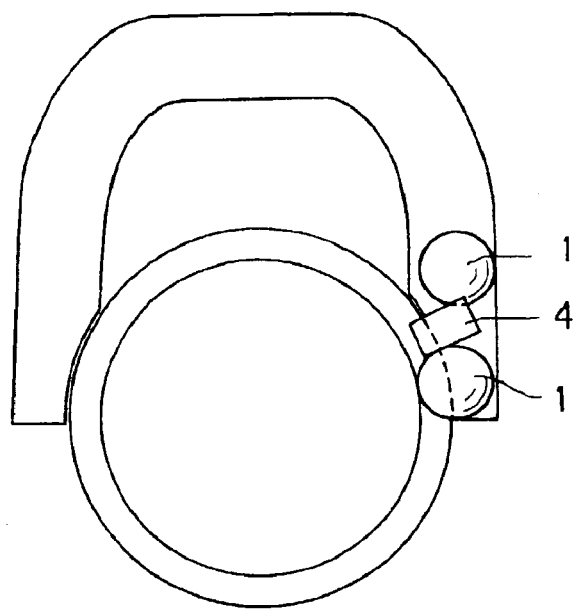
FIG. 21 is an illustration, viewed from the axial direction of a screw shaft, showing a state that a ball is engaged with the scoop-up groove.
Figure 22:
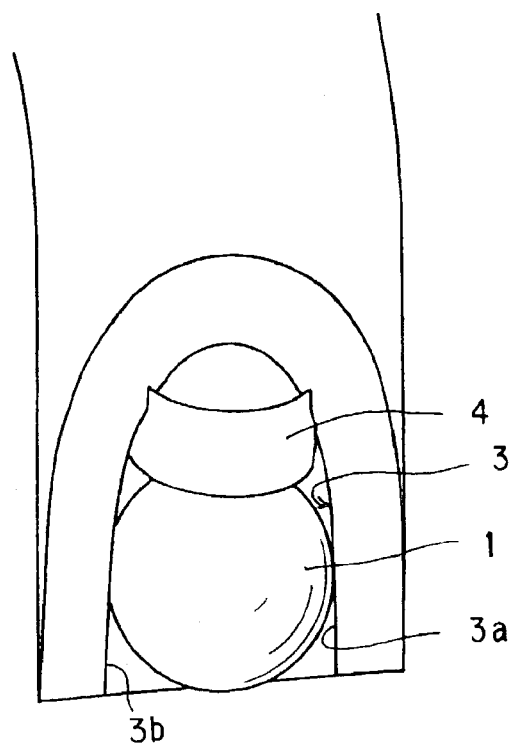
FIG. 22 is an illustration, viewed from the front side of the scoop-up groove, showing a state that a gap grows between adjacent balls.

FIG. 19 also shows an example of a ball spline provided with the circulation member according to the present invention.

The ball spline is composed of a spline shaft 71 as track rail and an outer sleeve 72 as a slide member mounted to the spline shaft 71 through a number of balls 11, 11—disposed therebetween.

The spline shaft 71 has a columnar structure having true circularity and has an outer surface formed as a ball track on which a ball rolling groove 71a so as to extend its axial direction.

The outer sleeve 72 mounted to the spline shaft 71 is formed with a loaded ball rolling groove corresponding to the ball rolling groove 71a so as to constitute a ball rolling passage as a ball circulation passage in form of circuit. In this ball circulation passage, a number of balls 11, 11,—and spacers 16, 16,—are accommodated so as to circulate therein in accordance with the relative linear motion of the outer sleeve 72 with respect to the spline shaft 71. That is, the ball rolling passage 73 is formed by the ball rolling groove 71a of the spline shaft 71 and the loaded ball rolling groove of the outer sleeve 72. A non-loaded return passage 74, in which the balls 11, 11,—released from the load, is formed adjacent to the ball rolling passage 73. On the other hand, the outer sleeve 72 is mounted with a circulation member 75 as a retainer for arranging and retaining the balls 11, 11,—in the axial direction of the spline shaft 71.

The circulation member 75 as a retainer is integrally mounted to the outer sleeve 72 and has an inner hollow cylindrical structure into which the spline shaft 71 is disposed in a penetrating manner. The circulation member 75 has an outer surface to which the circuit-formed ball circulation passage is formed. According to this circulation member 75, the balls 11, 11,—rolling on the ball rolling passage 73 are held from both sides between the outer sleeve 72 and the spline shaft 71 and the balls 11, 11,—rolling on the loaded return passage 74 are held between the outer sleeve 72 and the passage 74 to thereby prevent the balls 11, 11,—from coming off at the time when the outer sleeve 72 is withdrawn from the spline shaft 71.

A ball scoop-up groove for scooping the balls 11, 11,—rolling on the ball rolling passage 73 is formed to the circulation member 75, which may also be formed with a spacer scoop-up portion for scooping us the spacers 16.

It is to be noted that the present invention is not limited to the described embodiments and many other changes and modifications may be made without departing from the scopes of the appended claims.

For example, a number of spacers arranged independently between the adjacent balls may be connected in series by using a band or belt member. Furthermore, the track rail of the motion guide device may be formed to provide a curved structure in place of the linear structure.

The present application claims priority under 35 U.S.C § 119 to Japanese Patent Application No.2002-184540 filed Jun. 25, 2002 entitled "CIRCULATION MEMBER, MOTION GUIDE DEVICE PROVIDED WITH CIRCULATION MEMBER AND BALL SCREW PROVIDED WITH CIRCULATION MEMBER". The contents of that application are incorporated herein by reference in their entirety.

What is claimed is:

1. A circulation member for circulating a number of balls and a number of spacers, each spacer being disposed between the balls, which are arranged in a ball rolling groove formed between a track member and a movable member, in accordance with a relative motion of the movable member with respect to the track member, wherein the circulation member is provided with a scoop-up groove for scooping the balls by contacting the ball rolling in the ball rolling passage at both side edge portions of the scoop-up groove and is provided with a spacer scoop-up portion which contacts and scoops the spacer moving in the ball rolling passage without contacting the balls.

2. The circulation member according to claim 1, wherein said spacer scoop-up portion is formed with an escape surface which is apart from a track of the ball scooped by the scoop-up groove and contacts the spacer.

3. A ball screw comprising:

a screw shaft formed, on an outer periphery thereof, with a spiral ball rolling groove;

a nut assembled with the screw shaft and formed, on an inner periphery thereof, with a spiral loaded ball rolling groove so as to oppose to the ball rolling groove formed on the screw shaft to thereby form a ball rolling passage;

a number of balls disposed in the ball rolling passage;

a number of spacers disposed between the balls in the ball rolling passage; and a circulation member for circulating a number of balls and spacers, each spacer being disposed between the balls in accordance with a relative motion of the nut with respect to the screw shaft, wherein the circulation member is provided with a scoop-up groove for scooping the balls by contacting the ball rolling in the ball rolling passage at both side edge portions of the scoop-up groove and is provided with a spacer scoop-up portion which contacts and scoops the spacer moving in the ball rolling passage without contacting the balls.

4. The ball screw according to claim 3, wherein said spacer scoop-up portion is formed with an escape surface which is apart from a track of the ball scooped by the scoop-up groove and contacts the spacer.

5. The ball screw according to claim 4, wherein said circulation member has a linear passage having a circular section for linearly moving the ball scooped up by the scoop-up groove, and said spacer scoop-up portion is formed at a bottom portion of the scoop-up groove and is formed with an escape surface which is inclined by a predetermined angle with respect to an inner peripheral surface of the linear passage in a sectional area including a center line of the linear passage.

6. A motion guide device comprising:

a track rail formed with a ball rolling groove;

a slide member mounted to the track member to be relatively movable with respect thereto and is formed with a loaded ball rolling groove so as to oppose to the ball rolling groove of the track member to thereby form a ball rolling passage;

a number of balls disposed in the ball rolling passage;

a number of spacers disposed between the balls in the ball rolling passage; and a circulation member for circulating a number of balls and spacers, each spacer being disposed between the balls in accordance with a relative motion of the slide member with respect to the track member, wherein the circulation member is provided with a scoop-up groove for scooping the balls by contacting the ball rolling in the ball rolling passage at both side edge portions of the scoop-up groove and is provided with a spacer scoop-up portion which contacts and scoops the spacer moving in the ball rolling passage without contacting the balls.

7. The motion guide device according to claim 6, wherein said spacer scoop-up portion is formed with an escape surface which is apart from a track of the ball scooped by the scoop-up groove and contacts the spacer.

* * * * *